United States Patent [19]

Stumpp et al.

[11] 4,359,991
[45] Nov. 23, 1982

[54] METHOD AND APPARATUS FOR FUEL METERING IN INTERNAL COMBUSTION ENGINES

[75] Inventors: Gerhard Stumpp; Ludwig Walz, both of Stuttgart; Gerhard Schielinsky, Schwaikheim; Wolf Wessel, Oberriexingen; Thomas Küttner, Stuttgart; Ulrich Flaig, Markgröningen; Fridolin Piwonka, Gerlingen; Hermann Eisele, Vaihingen-Enz; Andreas Boehringer, Stuttgart; Hans Kubach, Korntal-Münchingen; Johannes Locher; Waldemar Becker, both of Stuttgart, all of Fed. Rep. of Germany

[73] Assignee: Robert Bosch GmbH, Stuttgart, Fed. Rep. of Germany

[21] Appl. No.: 228,399

[22] Filed: Jan. 26, 1981

Related U.S. Application Data

[63] Continuation of Ser. No. 163,015, Jun. 25, 1980, abandoned, which is a continuation of Ser. No. 958,086, Nov. 3, 1978, abandoned.

[30] Foreign Application Priority Data

Jan. 28, 1978 [DE] Fed. Rep. of Germany ....... 2803750

[51] Int. Cl.³ .................. F02D 37/02; F02D 5/00; F02B 3/00; F02M 25/06
[52] U.S. Cl. .................................. 123/478; 123/486; 123/492

[58] Field of Search .............. 123/478, 480, 489, 440, 123/438, 437, 479, 486, 487, 488, 492, 571

[56] References Cited

U.S. PATENT DOCUMENTS

| 3,898,962 | 8/1975 | Honig et al. | 123/492 |
|---|---|---|---|
| 3,935,851 | 2/1976 | Wright et al. | 123/478 |
| 3,983,848 | 10/1976 | Hundtmann et al. | 123/478 |
| 4,048,965 | 9/1977 | Bianchi et al. | 123/486 |
| 4,116,169 | 9/1978 | Krupp et al. | 123/486 |
| 4,142,493 | 3/1979 | Shira et al. | 123/486 |
| 4,166,437 | 9/1979 | Bianchi et al. | 123/486 |

FOREIGN PATENT DOCUMENTS 2034930 10/1979 United Kingdom ............... 123/478

*Primary Examiner*—Raymond A. Nelli
*Attorney, Agent, or Firm*—Edwin E. Greigg

[57] ABSTRACT

A fuel control system for an internal combustion engine with correction for optimum values based on a variety of factors. Characteristic engine data is stored in preferably digital memories with capabilities for interpolation. Upon addressing the engine data fields with input signals related to current operational variables, for example the accelerator pedal position, the control system derives therefrom a nominal air flow rate which is used as the reference value in a control loop that sets the amount of recycled exhaust gas and the fresh air flow. As the actual air flow rate approaches the reference value, the fuel flow is adjusted to insure correct mixtures at all times. In another embodiment, the fuel is supplied on demand but cannot exceed a maximum value except under special override conditions. Several other embodiments and variants are presented.

24 Claims, 14 Drawing Figures

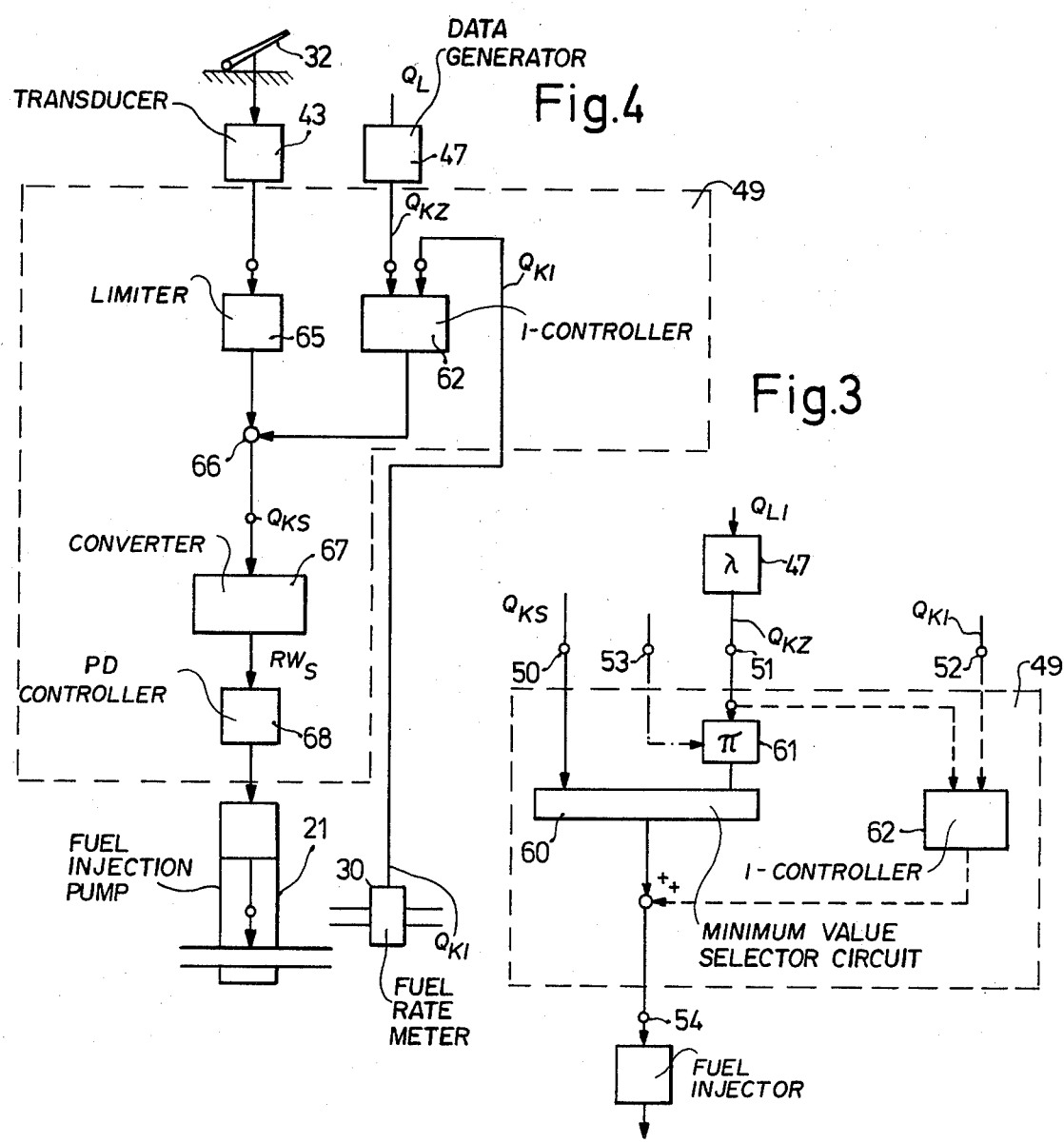

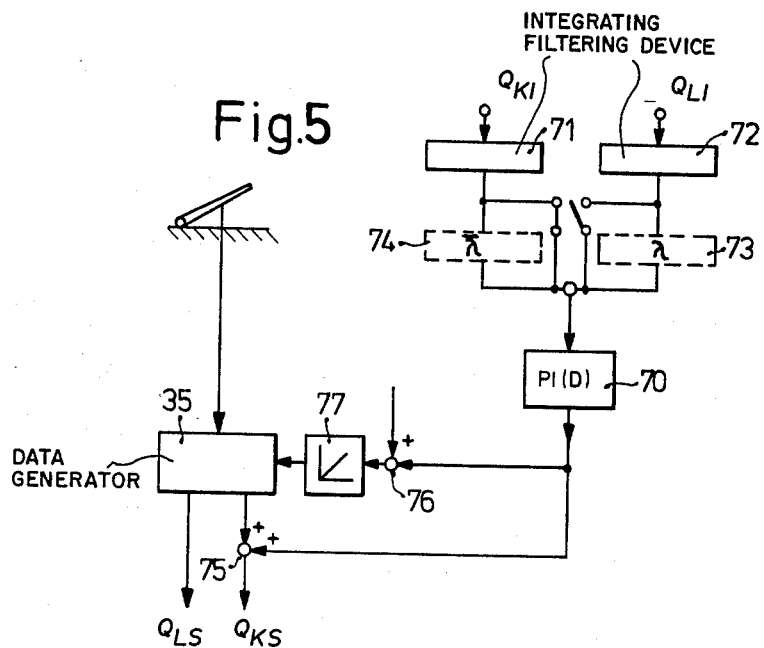
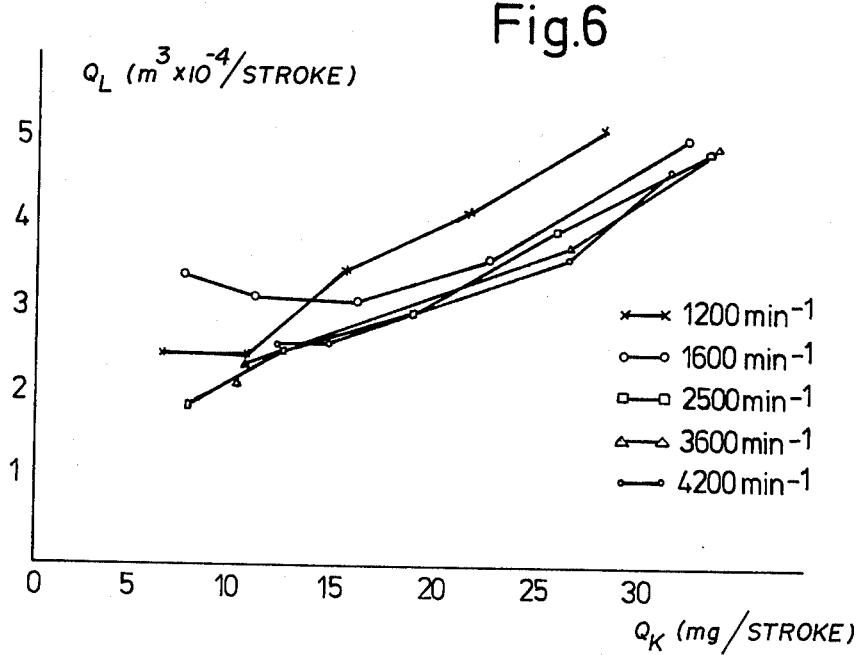

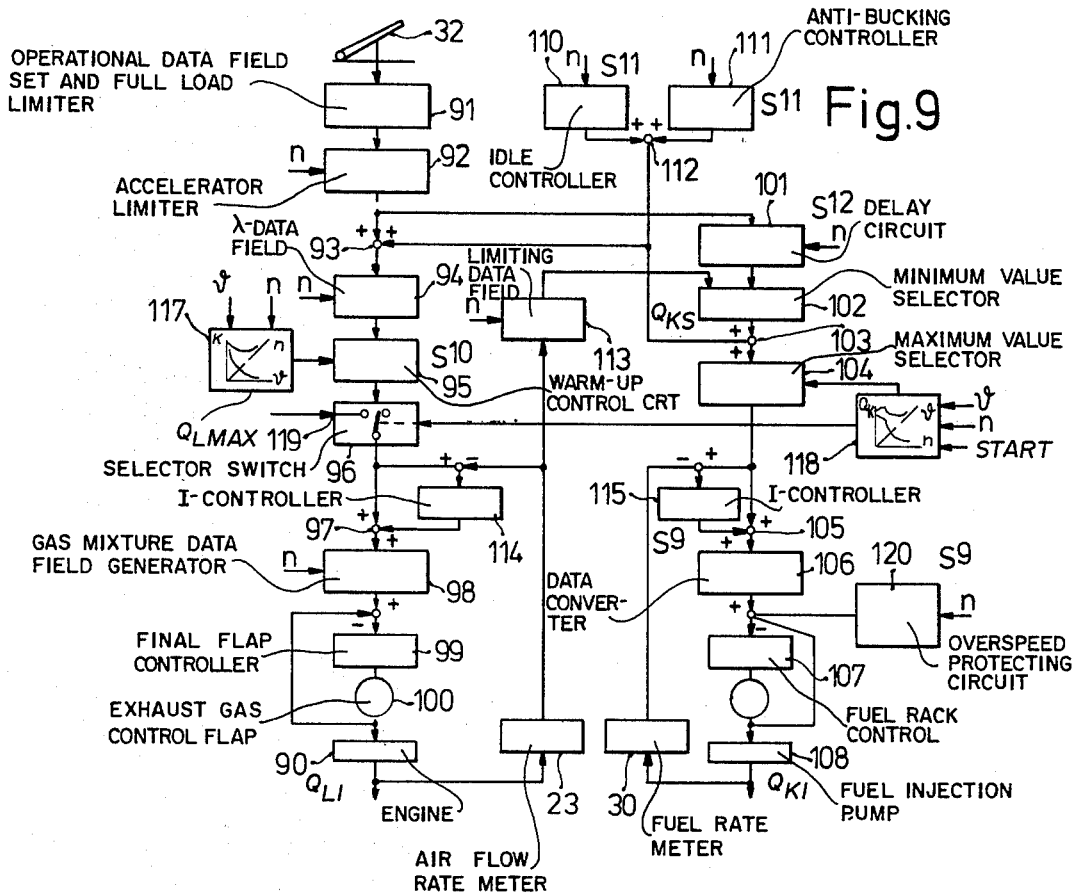
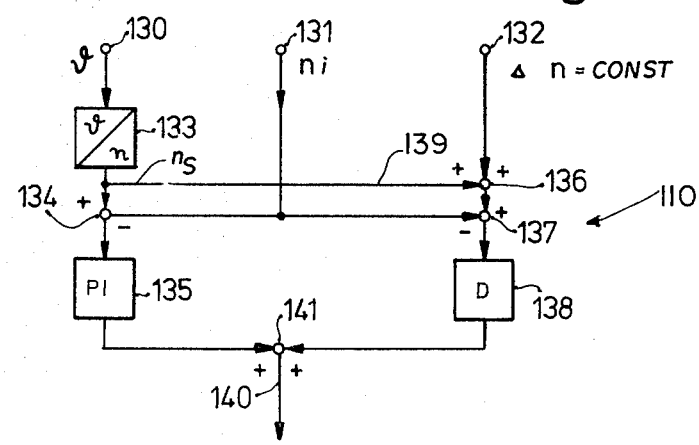

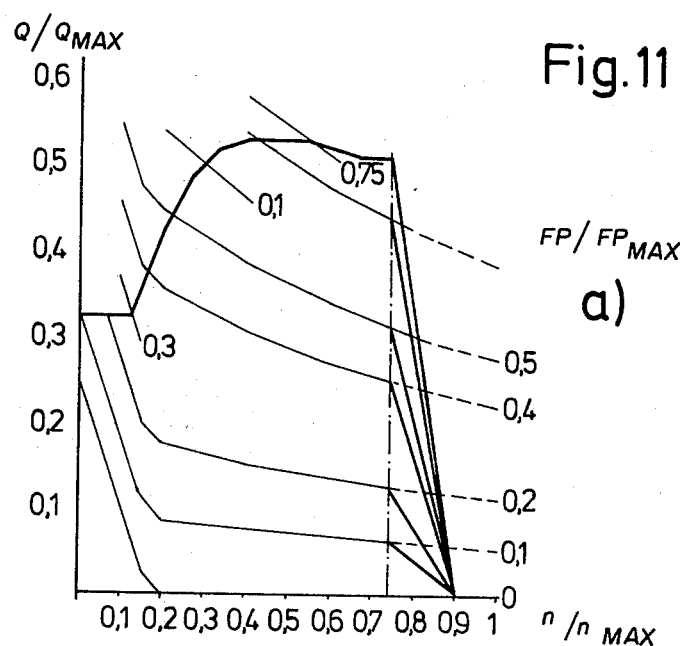
Fig.11 a)
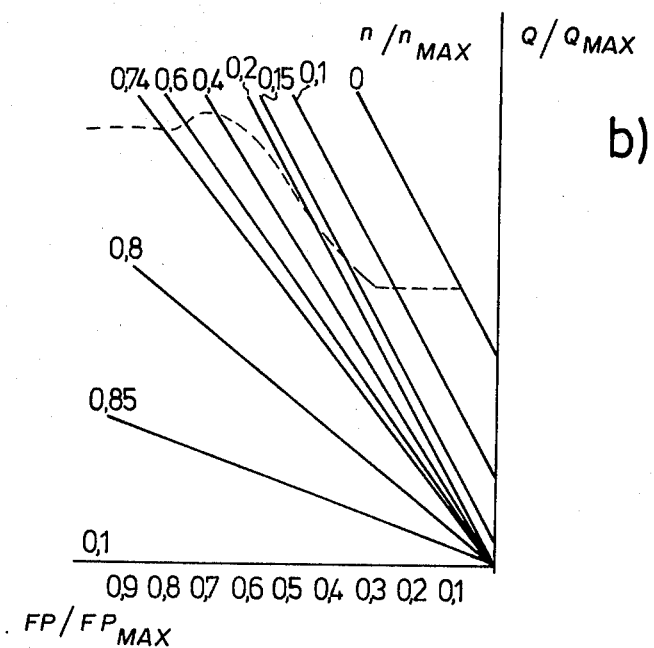
b)

METHOD AND APPARATUS FOR FUEL METERING IN INTERNAL COMBUSTION ENGINES

This is a continuation, of application Ser. No. 163,015 filed June 25, 1980 now abandoned, which is a continuation of Ser. No. 958,086 now abandoned filed Nov. 3, 1978.

FIELD OF THE INVENTION

The invention relates to a method and apparatus for determining the correct and optimal fuel-air mixture for an internal combustion engine with respect to the constitution of the exhaust gas, the power, the specific consumption and the drivability of the vehicle equipped with the engine. More particularly, the invention relates to a method for determining the correct fuel-air quantity on the basis of multi-dimensional characteristic data sets. The apparatus for carrying out the invention includes a computer which calculates the nominal values for air and/or fuel on the basis of system characteristics and operational conditions.

BACKGROUND OF THE INVENTION

Self-igniting internal combustion engines, sometimes referred to as Diesel engines, must be supplied under all operational conditions with the exact amount of fuel necessary for combustion so as to prevent excessive magnitudes of any of the exhaust gas components HC, CO, $NO_X$ or excessive smoke. Under all circumstances, even when exhaust gas recycling is used in order to reduce the amount of $NO_X$, the fuel quantity which is injected should never exceed the quantity for which sufficient combustion air is available. Further conditions which must be met by the fuel supply system are a constant idling speed, favorable drivability and automatic starting control. Still further objectives are the suppression of any bucking of the vehicle and of the engine and a certain amount of insensitivity against aging and increasing mechanical tolerances in the system.

A Diesel engine requires a precisely determined minimum amount of air for each and every operational condition, i.e., a given engine speed (rpm), load, temperature, etc., in order that the limits of exhaust gas constituents are not exceeded. The associated multi-dimensional characteristic data sets cannot be embodied in mechanical devices. In contemporary Diesel engines, it is customary to provide a given amount of fuel with the expectation that the engine will be able to aspirate sufficient air to completely combust the fuel. However, in modern designs of engines which must meet constantly increasing demands with respect to power while maintaining a relatively small size the adequate supply of oxygen into the combustion chambers may not be guaranteed at all times.

OBJECT AND SUMMARY OF THE INVENTION

It is thus a principal object of the invention to provide a fuel-air mixture system which recognizes the intentions of the vehicle operator and calculates a nominal air quantity which becomes the control signal for a mixture valve which defines the amount of recycled exhaust gas. The invention then further uses the output signal of an air flow sensor which measures the actual air flow rate and, on the basis of that datum, determines the permissible maximum amount of fuel. It is a further object of the invention to admit the amount of fuel desired by the operator on a temporary basis and to use signals related to the maximum permissible fuel quantity as well as to the predelivered quantity to a fuel control loop for ultimate overall control. The advantage of the latter method is to produce a rapid reaction of the fuel supply or fuel injection system to any changes in the position of the accelerator pedal.

It is a further feature of the invention that the calculations of the air and fuel quantities are made on the basis of the requirements per power stroke of the pistons because the dynamic range of signals is then substantially narrower than in a system in which these magnitudes are calculated as a function of time.

It is a still further object of the invention to provide an apparatus for carrying out the aforementioned method and including in the apparatus at least one stored set of characteristic engine data whose contents are addressed by signals coming from sensors for detecting engine variables and whose output is used to determine the required air quantities but is subject to a variety of corrective measures on the basis of still further conditions. In a further feature of the invention, there may be provided a second stored set of characteristic data to generate a nominal fuel quantity. The maximum fuel quantity may be determined on the basis of a third set of data related to exhaust gas composition as measured by an exhaust gas sensor.

The invention will be better understood as well as further objects and advantages thereof become more apparent from the ensuing detailed description of a number of preferred embodiments taken in conjuction with the drawing.

BRIEF DESCRIPTION OF THE DRAWING

FIG. 3 is a schematic diagram of a fuel controller such as used in the circuit of FIG. 2;

FIG. 4 is a block diagram of a second exemplary embodiment of a fuel controller for use in FIG. 2;

FIG. 5 is a circuit diagram including a drift controller;

FIG. 6 is a diagram illustrating measured values of the optimum air quantity per stroke as a function of fuel quantity per stroke;

FIG. 9 is a detailed block diagram of the system illustrated in FIG. 2;

FIG. 10 is a detail of the circuit diagram of FIG. 9;

FIGS. 11a and 11b are diagrams for illustrating full-load limitation;

DESCRIPTION OF THE PREFERRED EMBODIMENTS

Figure 1:
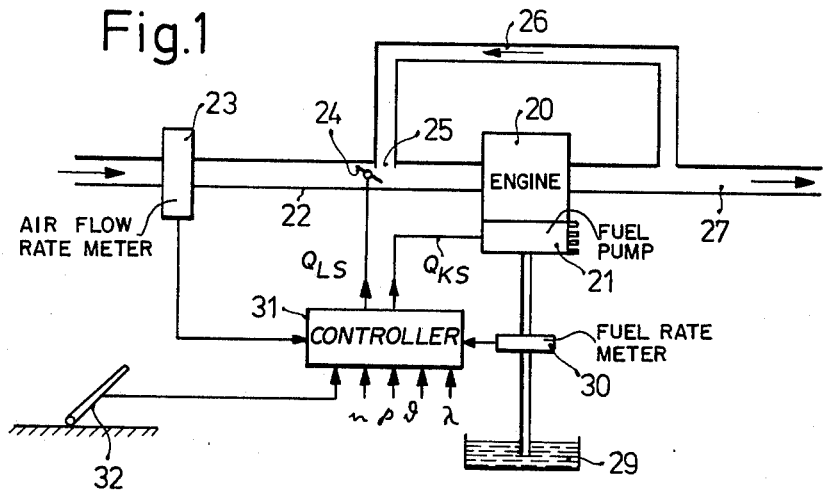
FIG. 1 is an overall block diagram describing a fuel supply system of an internal combustion engine.

FIG. 1 is an overall block diagram of an internal combustion engine 20 including an air induction tube 22 and an exhaust pipe 27. The system further includes a controller 31 which has a plurality of inputs and a number of outputs for various signals. The engine 20 is supplied with fuel by a fuel supply pump 21. The induction tube 22 includes an air flow rate meter 23, and an air exhaust gas mixture valve 24 which cooperates with the terminus of an exhaust gas recycle conduit 26 which terminates in the induction tube at a location 25. The fuel injection pump 21 receives fuel from a fuel container 29 after passage through a fuel rate meter 30. The controller 31 receives input signals from the air flow rate meter 23 and the fuel flow rate meter 30 as well as from the accelerator pedal 32. Still other signals fed to the controller are those relating to engine variables, for example engine speed (rpm), pressure, temperature and/or exhaust gas composition. The controller 31 processes these various data and generates output signals which represent nominal values that are applied to the mixture valve 24 and to the fuel injection pump 21.

FIG. 1 illustrates that the various operational magnitudes are used to generate two nominal or set-point values which are used to control the position of the gas mixture valve 24 and the fuel injection pump 21. The measurements of the various flow rates are used to generate signals corresponding to the actual values of the air and fuel which are fed back to the controller to perform closed-loop control of these variables. The block circuit diagram of FIG. 1 is applicable in principle to any type of internal combustion engine, i.e., self-igniting (Diesel) engines as well as externally ignited (spark plug ignited) internal combustion engines. However, the detailed description which follows will be specifically related to a self-igniting internal combustion engine although the systems to be described are capable in principle of being adapted to a spark plug ignited engine.

Figure 2:
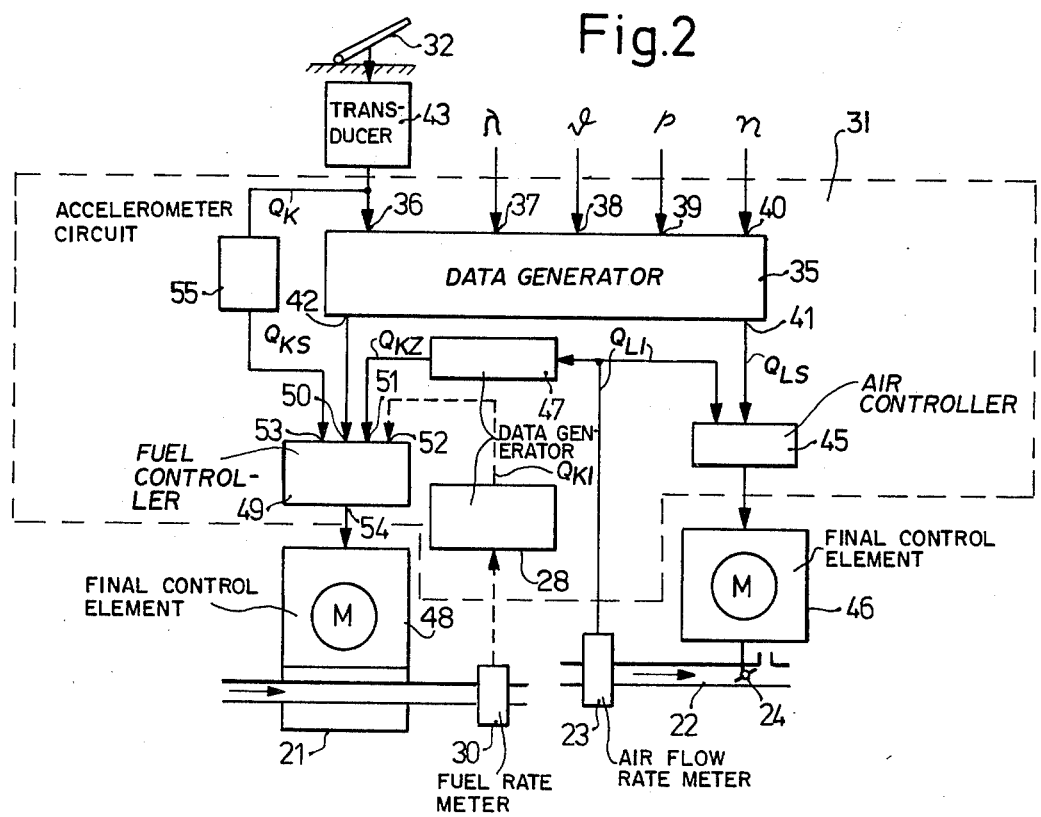
FIG. 2 is a block circuit diagram related to the control of individual metering systems.

FIG. 2 is a block circuit diagram which illustrates the manner of controlling the individual metering devices of FIG. 1, i.e., the gas mixture valve 24 and the fuel injection pump 21. The most important component of the block diagram of FIG. 2 is a characteristic data generator 35 having inputs 36–40 and two outputs 41 and 42. The input 36 of the data generator 35 is connected to receive a position signal from an accelerator pedal transducer 43 connected to the accelerator pedal 32. The input 37 (labeled $\lambda$) is essentially a free input contact to which may be applied a number of various signals for engaging the generator 35. The input 38 receives a temperature related signal, the input 39 receives a pressure signal and the input 40 receives an engine speed signal (rpm signal). The outputs of the characteristic data generator 35 are signals relating to the nominal air quantity and the nominal fuel quantity.

The variety of possibilities for engaging the characteristic data generator makes it clear that multi-dimensional data fields are required to generate the desired output signals. In the example illustrated, the characteristic data generator 35 may be embodied, for example, by a digital computer, for example the type PDP 11/04 sold in commerce by the firm Digital Equipment Corporation, as a microprocessor system. The digital computer permits the storage of multi-dimensional data fields in digital memories in the form of grids of major magnitudes from which intermediate values are obtained by interpolation. The possibility of computing intermediate values makes it possible to store only a limited number of values which tends to reduce the requirements for memory capacity. A particularly attractive feature of this system is the possibility of exchanging digital memories for the purpose of adapting an existing injection system to different engine types. This possibility for adaptation makes the system according to the invention extremely flexible. Another advantage of digital processing of input signals is the possibility to improve the required precision to any desired degree in a way which is not subject to the error of wear and tear on the parts of the system. The ultimate precision which the system is capable of performing depends on the precision of the transducers and the degree of quantization within the computer, i.e., the internal resolution. For a given bit size within the computer, the limit of resolution depends on the variation in the magnitude of the signal to be processed, i.e., the dynamic range. For this reason, the computer processes the air and fuel values per engine stroke where the variation between idling and full load has a ratio of approximately 1:4 rather than as a function of time where its variation would be of the order of 1:40. Accordingly, the computer may operate with a lower bit size which permits its cost to be reduced and its processing speed to be enhanced.

The output 41 of the data generator 35 which carries the nominal signal $Q_{LS}$ for the air flow rate is connected to an air flow rate controller 45 which sets a final control element 46 that turns the mixture valve 24. As may be seen more clearly from the illustration of FIG. 1, the gas mixture flap or valve 24 also adjusts the amount of recycled exhaust gas. The manner of simultaneous control of air and exhaust gas may be adapted to the requirements of individual engines.

The actual air flow rate is measured by an air flow rate meter 23 which sends its signal $Q_{LI}$ to an input of the air flow rate controller 45. This signal is also applied to a data generator 47 which computes from it the maximum permissible fuel quantity for a fully combustible mixture in the engine.

This signal is applied on an input contact 51 to a fuel rate controller 49. The fuel rate controller 49 also receives a signal relating to the nominal fuel quantity to an input contact 50, an acceleration signal from an accelerometer circuit 55 on an input contact 53, and an actual fuel quantity signal on an input contact 52. The contact 52 receives the actual fuel quantity signal directly from the fuel rate meter 30 or from a data generator 28 which is connected to the fuel rate meter 30. The output 54 of the fuel controller 49 is fed to a final control element 48 which ultimately adjusts the output of the fuel injection pump 21.

If the exhaust gases of the engine are to be maintained within acceptable limits, any amount of fuel supplied to the engine must be accompanied by a suitable amount of air to permit complete combustion. If an unlimited amount of air is unavailable, for example when the air density is low as in operations at high altitude, the amount of fuel injected must not exceed the value which can be combusted with the available amount of air. In order to control this condition, the air flow rate actually admitted to the engine is measured and is related to a power stroke of the engine from which the maximum fuel quantity is calculated. The calculation is obtained with the aid of a possibly multi-dimensional characteristic data set from the available signals relating to the air quantity per stroke.

In the fuel systems to be described below, the engine is assumed to employ exhaust gas recycling, i.e., the cylinders are filled partly with fresh air and partly with recycled exhaust gas. Inasmuch as the overall degree of cylinder filling is independent of the composition of the air/exhaust gas mixture, the amount of exhaust gas recycled may be adjusted to control the amount of fresh air admitted.

When the operator depresses the accelerator pedal 32, the transducer 43 generates a signal which is fed to the electronic controller 31 where the characteristic data generator 35 calculates the instantaneous nominal air quantity and generates the nominal air quantity signal $Q_{LS}$. In order to actually obtain this air flow rate, associated with this signal, the final control element 46 in FIG. 2 must move the mixture flap 24 into a particular position. The air controller 45 may receive signals related to other variables, for example engine speed and exhaust gas pressure for determining the proper position of the gas mixture valve 24. For this purpose, the air controller 45 may include a further data set which takes into account the variables other than the nominal air flow rate.

If no air controller 45 is used, i.e., if the actual air flow rate may not be used for control purposes, the secondary characteristic data generator for air control may be included within the main controller 31 as part of its characteristic data generator 35.

It is the purpose of the air flow rate controller 45 to adapt the actual air flow rate with the aid of the gas mixture flap 24 to the value prescribed as nominal by the characteristic data generator 35. By monitoring the actual air flow rate, it is possible to dispense with a signal related to the mechanical position of the gas mixture flap 24, although the response time is somewhat reduced in this way.

The actual air flow rate value is used to determine the amount of fuel which would insure a properly combustible mixture for the engine. This calculation is performed by the λ data field of the data generator 47 which engages the fuel controller 49 which, in turn, influences the fuel injection pump 21 to deliver a proper amount of fuel. The system described so far may be called an "air control system" and it offers the advantage that, when the gas pedal is depressed, the fuel quantity is raised only when the air required for the combustion of fuel is actually present because, while the fuel adjustment is performed very rapidly, the correct air quantity can be adjusted only with substantial delay because the induction tube volume must be filled and the time of traversal of the air in the induction tube is considerable. In this system, even a lack of air at high altitude would not cause impermissibly high fuel quantities.

If the reaction time which is required for adjusting the amount of fuel to a new rational state is to be reduced, i.e., if the response of the fuel injection pump 21 to new operational states must be made faster, it is possible to use a so-called "fuel control system". In such a system, the characteristic data generator 35 determines the nominal fuel quantity on the basis of the operational variables admitted as inputs. The nominal fuel quantity is taken from the output 42 of the data generator 35 and applied directly to the fuel controller 49 so that the nominal amount of fuel is available at a time when the air flow in the induction tube 22 has not yet been adjusted to the new operational state. The flow of control in the air control system is explained in more detail with reference to FIG. 13.

The amount of fuel desired by the operator is signaled to the characteristic data generator 35 which generates a nominal fuel quantity signal $Q_{KS}$ at the output 42. At the same time, the nominal air flow rate $Q_{LS}$ is signaled on the output 41 and is passed on to the air flow controller 45. The actual air flow rate is then used in the λ data field of the data generator 47 to generate a signal relating to the maximum amount of fuel. In this configuration, three different operational states must be considered:

When the accelerator pedal is held steady, the fuel controller 49 must choose the smaller of the two signals present at the nominal fuel input 50 and the maximum permissible fuel input 51.

If the driver wishes to decelerate the vehicle, the pressure on the accelerator pedal 32 is reduced, which signals a reduced nominal fuel quantity at the output 42 of the characteristic data generator 35. However, the reduced value of the air flow rate will be signaled by the air flow rate meter 23 only after a substantial delay as a new value for the permissible maximum fuel quantity. By selecting the smaller of the two values, the fuel controller 49 insures that the fuel supplied corresponds to the actual intent of the operator.

However, the minimum value selector does not improve the dynamic behavior in the case of acceleration because the smallest value will be the maximum permissible fuel signal and this signal is able to adapt only slowly to the altered operational conditions. However, the dynamic operation may be improved in the case of acceleration by, for example, multiplying the maximum permissible fuel value based on the air flow rate calculation by a predetermined constant factor, for example 1.1, or else by adding to it a constant value. After some time however, both the air and fuel rates will reach their nominal values so that, in the case of a deficiency, for example if not enough air is available at high altitudes, the amount of fuel will be deliberately set too high.

This latter condition may be ameliorated by employing a controller having an integral part in association with a fuel quantity meter or else by using a device which makes the multiplication factor dependent on the rapidity of accelerator pedal actuation and which reduces the multiplication factor to the value unity (1.0) after some time has elapsed. These various possibilities are depicted in the block circuit diagrams of FIGS. 3 and 4 which will now be described.

FIG. 3 is a diagram illustrating one possible embodiment of the fuel controller 49 in FIG. 2. The input signals are related to the actual value at 52, the nominal value at 42 and the maximum permissible value of the fuel flow rate at 51. A further input signal at 53 is an accelerator signal which recognizes the rapidity of actuation of the accelerator pedal which is generated by the accelerometer circuit 55 (FIG. 2). The most important component of the circuit of FIG. 3 is the minimum value selector circuit 60 which receives the nominal fuel quantity signal at one input and the maximum fuel quantity signal at another input after it passes through a multiplier circuit 61. The output labeled 54 in FIG. 3 is seen to be identical with the output 54 of the fuel controller 49 of FIG. 2. FIG. 3 also illustrates an I-controller 62 whose inputs are connected with the inputs 51 and 52 of the fuel controller 49 and whose output is also fed to the output 54 of the fuel controller.

The dashed connecting lines in FIG. 3 are intended to illustrate the alternative use of individual components. For example, the multiplication factor applied by the circuit 61 may be made dependent on the rapidity of actuation of the accelerator pedal so that, during acceleration, the effect of the minimum value selector 60 is overridden and the nominal fuel quantity is actually used for engaging the fuel controller 49. A disadvantage of this procedure is that, by overriding the minimum value selector during acceleration, an optimum exhaust gas composition probably cannot be achieved because, for a given air throughput, the injected fuel quantity will be too high. However in steady state operation, i.e., when the position of the accelerator pedal is maintained at a constant setting, the multiplication factor applied by the circuit 61 returns to the value unity (1.0) so that optimum fuel supply is reestablished.

Alternatively, the multiplier circuit 61 can also be adjusted to supply a constant multiplication factor, for example 1.1, which however generates a constant error in operation at high altitude.

A still further possibility of connection is shown by the inclusion of the I-controller 62 which insures that the permissible fuel quantity is not exceeded. This behaviour is useful to generate a proper exhaust gas composition at high altitude.

FIG. 4 illustrates a circuit which may be used to eliminate the minimum value selector circuit 60 of FIG. 3. Present again is the I-action controller 62 which receives the information "maximum permissible fuel quantity $Q_{KZ}$" from the λ data field of the data generator 47 as well as the information actual or instantaneous fuel quantity $Q_{KI}$ from the fuel flow meter 30 or an equivalent indication from the fuel injection pump. The controller 62 corrects the value of fuel as indicated by the accelerator pedal in such a way as to correspond to the permissible value. Connected behind the gas pedal transducer 43 is a limiter circuit 65 whose output is applied to a summing point 66. The limiter circuit 65 prevents a too rapid increase of the signal generated by the transducer 43. The second input of the summing point 66 receives the output of the I-action controller and, following the summing point 66, is a converter 67 which generates a fuel rack control signal from the nominal fuel signal $Q_{KS}$ applied at its input. The fuel rack control signal $RW_S$ is applied to a PD-action controller 68 which directly engages the fuel injection pump 21. The time constant of the I-action controller 62 is advantageously relatively slow and tends to filter out short-term variations of air flow rate and fuel supply quantity.

Taking the place of the relatively slow I-action controller 62 of FIG. 4 is a relatively rapidly acting controller, for example a PI-action controller, possibly augmented by a D-action as illustrated in the exemplary embodiment of FIG. 5. The circuit of FIG. 5 further includes a drift controller 77 whose function it is to correct any errors caused, for example, by aging of the fuel injection pump. The apparatus illustrated in FIG. 5 has the following basic construction:

The principal element of the apparatus of FIG. 5 is a PI-action controller 70 which may be augmented to a PID-controller. The input values for this controller 70 are either air data or fuel data as indicated schematically by the switches. Each of the inputs is followed by an integrating and filtering device 71 and 72 which recognizes the values of air and fuel per engine stroke. If the controller 70 is to process fuel data, the actual, i.e., instantaneous air quantity $Q_{L1}$ must first be fed to a data converter 73 (λ) for converting the air value into a corresponding fuel value. That setting corresponds to the position of the switch as shown, in which the actual fuel value is integrated and filtered and then passed on to the controller 70 directly. On the other hand, if the controller is to process air data, a suitable data converter 74 (λ) must be connected between the input of the actual fuel value $Q_{KI}$ and the controller 70.

The output of the controller 70 goes to two points, a summation point 75 and a comparison point 76. Connected between the point 76 and one input of the characteristic data generator 35 is the drift controller 77 which has the task of taking over any control functions which are due to aging and wear and tear. The presence of the drift controller 77 insures an improved dynamic behavior of the control loop when relatively old mechanisms are used. The nominal input reference value of the drift controller 77 is the value zero while its actual input value is the prevailing output error of the fast acting correction controller 70.

Inasmuch as the controller 70 compares the instantaneous and set-point values of fuel and air at its input, its output signal will be different from 0 if the two input values deviate from one another. Only in that instance does the summing point 75 sense a difference between the output signal of the characteristic data generator 35 and the input signal of, for example, the fuel controller 49. Provision for selective switching between actual values of air and fuel is made because it may be advantageous for reasons of control technology to compare the actual and set-point values for the fuel correction controller on the air mechanism of the engine rather than on the fuel mechanism. In that instance, the air flow rate is compared with the air quantity required for the instantaneous fuel rate and, if deviations are present, the fuel rate is adjusted until the required air quantity corresponds to the actually available air quantity.

The method and system so far described require for correct functioning that it be possible to define a single value for the fuel quantity to be associated with any measured air flow rate $Q_L$. In experiments on engines, it has been found that this condition is not always met as is illustrated by curves which represent the experimental data such as those illustrated in FIG. 6. Shown there is a family of curves representing the air quantity per piston stroke as a function of the fuel quantity per piston stroke at different engine speeds. In this diagram, the curve for the engine speed of 1600 rpm is seen to have two branches, i.e., the same air flow rate can be associated with two different fuel quantities. Unless special precautions are taken, data fields of this type may not be used correctly in the systems heretofore described.

In order to adapt the systems to the use of multivalued characteristic curves, there exists a first possibility of storing the extreme values, i.e., the minima or maxima, in a computer and to compare the signal generated by the accelerator pedal transducer, i.e., the desired amount of fuel, with the extreme value lying closest. Such a comparison will decide which branch of the curve is to govern the operation. However, when the characteristic curve is relatively shallow, i.e., has a relatively low slope in the vicinity of the extremum, the correct fuel quantity cannot be found very precisely from a determination of the air flow rate. Furthermore, even the smallest changes in the air quantity, for example due to pulsations, would entail relatively large changes in the fuel quantity and thus large changes in engine torque, which would produce an undesirable and poor behavior of the vehicle.

Figure 7:
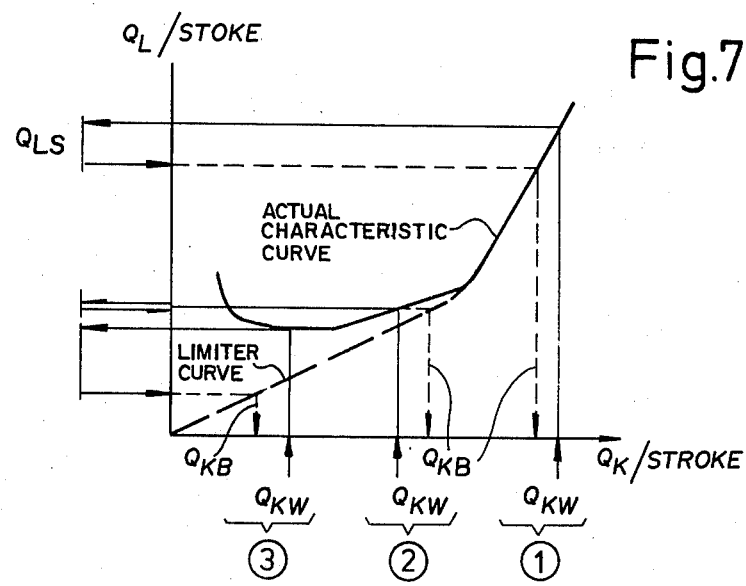
FIG. 7 is a diagram for the illustration of the operation of the fuel limiter.

A second method to deal with multi-valued characteristic curves is illustrated in FIG. 7 in the principle of an air/fuel quantity data field. Shown in FIG. 7 is a bi-valued characteristic curve as well as a so-called limiter curve. The limiter curve is drawn to correspond to the actual characteristic curve over a relatively wide range but, in those regions where the actual characteristic curve becomes very shallow or bi-valued, the substitute or limiter curve provides a single-valued set of values. The electric controller receives the desired fuel quantity $Q_{KW}$ and uses it in the original or actual characteristic curve to find the associated nominal or set-point air quantity $Q_{LS}$ which is then fed to the air controller 45 to attempt an adjustment of the mixture flap and these values correspond to the solid vertical and horizontal lines in FIG. 7. The actual air flow rate is then used in the limiter curve to derive an associated maximum permissible fuel quantity $Q_{KB}$ (dashed lines) which is compared with the desired quantity $Q_{KW}$ in a minimum value selector. The smaller of these two values $Q_{KW}$ and $Q_{KB}$ is then fed to the fuel controller as the quantity which governs the injected fuel.

The normal operational case, labeled 2 in FIG. 7, is the case where $Q_{KW} \leq Q_{KB}$, where the desired fuel quantity is actually injected. However, if the vehicle is operated at, for example, high altitude, where there is a shortage of air, and an attempt is made to accelerate or, again, if there is some malfunction in the engine which tends to reduce the amount of available air, the limiting curve becomes effective. In these cases, i.e., cases 1 and 3, the following takes place: in case 1, the original curve is effective inasmuch as it is identical with the limiting curve. Wherever the limiting curve and the original curve deviate, the desired fuel quantity $Q_{KW}$ is actually injected in spite of a shortage of air as long as that shortage does not exceed the value which is defined by the limiting curve $Q_{KB}$. In a true malfunction (case 3) $Q_{KB} < Q_{KW}$ which insures at least emergency operation although the engine torque is diminished.

Figure 8:
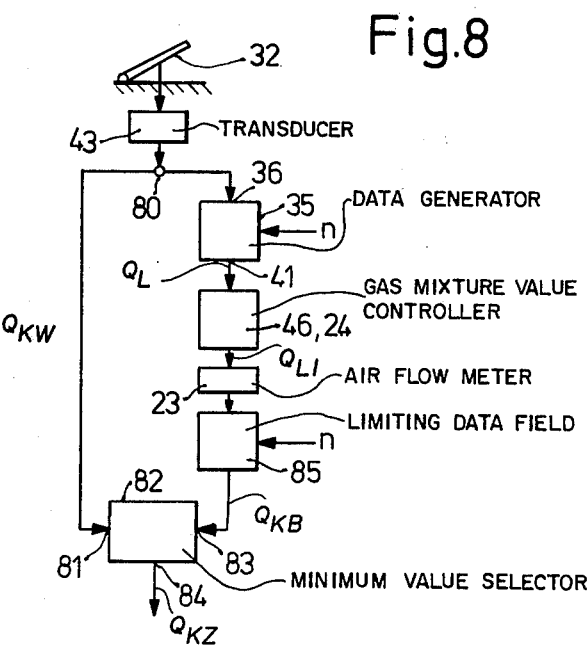
FIG. 8 is a block diagram of an embodiment of a fuel limiter circuit.

The various states and operations illustrated in FIG. 7 are carried out by an apparatus shown schematically in FIG. 8. Shown here is the accelerator pedal 32 which actuates a transducer 43 whose output signal goes to a junction 80 from which it enters an input 81 of a minimum selector circuit 82 having a further input 83 and an output 84 and is also applied to an input 36 of the previously discussed characteristic data generator 35 (see FIG. 2). Connected behind the circuit 35 is the gas mixture valve controller 46 which sets the mixture flap 24 whose position changes the air flow rate in the induction tube. That flow rate is measured by the air flow meter 23 as an actual value signal which is applied to a limiting data field 85. The limiting data field has a unique characteristic curve corresponding to the long dashed curve in FIG. 7 and its output is applied to the input 83 of the minimum value selector 82.

The overall interconnected fuel mixture control system according to the invention is illustrated in FIG. 9, representing both air and fuel flow rate meters and closed loop control. This requires a separation of the characteristic data sets, for example a representation of the nominal air rate as a function of the desired fuel quantity $Q_{KW}$ and the gas mixture valve position as a function of a corrected nominal air quantity. The detailed construction of the circuit of FIG. 9 is as follows:

Connected between the accelerator pedal 32 and the block 90 which designates the internal combustion engine, there are connected in series these functional blocks: an operational data field set and full-load limiter 91, an accelerator limiter 92, a summation point 93, a λ data field 94 for determining the nominal or set-point air quantity, an engine warm-up control circuit 95, a selector switch 96, a further summation point 97, a gas mixture data field generator 98 to determine the set-point value of the gas mixture flap as a function of the nominal air flow rate and the engine speed, a final flap controller 99 for setting the position of the combined mixture and exhaust gas control flap 100 whose position is detected and fed back to the input of the controller 99.

The aforementioned elements constitute what might be called the air control branch. In addition thereto, the system includes a fuel control branch which starts at the accelerator limiter 92 and includes, in series, a delay circuit 101, a minimum value selector 102, a summation point 103, a maximum value selector 104, a further summation point 105, a data converter 106 for converting the nominal fuel quantity and the engine speed into a signal defining the position of the control rack in the fuel injection pump, a final fuel rack control element 107 and a fuel injection pump 108. Further contained in the apparatus of FIG. 9 is an idle controller 110 and an anti-bucking controller 111 whose outputs are summed at a point 112 which, in turn, is joined to the summation points 93 and 103. The air flow rate meter 23 is connected via the limiting data field 113, which was discussed in connection with FIGS. 7 and 8, to the minimum selector circuit 102 and is further connected via a bypass I-action controller 114 to the summation point 97. A further bypass I-action controller 115 processes the signals of the actual fuel values and the signals from the output of the maximum value selector 104.

The warm-up control circuit 95 is a multiplier circuit which receives its multiplication factor from a special data field 117.

Still another data field 118 is used to derive data for the engine starting control and its first output value is fed to the maximum value selector 104 while its second output signal switches the switch 96 during engine starting over to an input 119 at which a signal for maximum starting fuel is applied. There is finally provided an overspeed protecting circuit 120 which feeds a limiting signal directly to the fuel rack 107.

The overall function of the device illustrated in FIG. 9 corresponds substantially to that illustrated in FIG. 2 and discussed above. The special characteristics by which the circuit of FIG. 9 differs from that of FIG. 2 will now be taken up.

Bypass I-Controller

The position signals relating to the gas mixture flap or the fuel rack as derived from the data storages 98 and 106, respectively, are applied by respective controllers 99 and 107 to the corresponding final control elements. The controllers used here are PD-controllers which may also be embodied as analog controllers and disposed outside of the digital computer. It should be noted that the air or fuel values commanded by these controllers are very nearly equal to the desired set-point values. However, unavoidable errors and tolerances occur due to aging and wear and tear, resulting in a residual error. This residual error is eliminated by the bypass I-controllers 114 and 115 in conjunction with the rate measurements. These controllers can operate relatively slowly but must do so with high precision. For this reason, it is preferable if the controllers 114 and 115 are part of the digital computer. The bypass I-controllers, due also to the direct coupling of the switch 96 to the point 97 or the selector 104 to the point 105, act like PI-controllers having a P-component=1. The dynamic characteristic of this system may be improved by using PI-controllers with a P-amplification >1 instead of the bypass I-controllers. Other types of control action are possible and may be used depending on the individual requirements.

Overspeed Protection

In order to protect the engine from attaining speeds which would damage it even if the control loop is defective, it is provided by the invention to insert an overspeed protection device directly into the electrical output of the final fuel injection pump control element. In order to permit this device to act rapidly, the rpm signal fed to the protective circuit 120 is not filtered via a low pass filter unless the filter has a relatively high limiting frequency; this is in contrast to all the other rpm signals in the block diagram which are filtered with a low pass filter having approximately a 6 Hz limit so as to prevent non-uniformities in the angular speed of the engine to become disturbances during an engine cycle.

Engine Starting Control

The fuel required for injection during engine starting depends uniformly on engine temperature. The fuel quantity is reduced at the attainment of a certain engine speed and is completely shut off whenever the driver or operator first calls for a value which is even higher. The maximum selector circuit 104 decides if the normal fuel quantity or the augmented starting quantity is to be injected. This selection calls for a control of the engine starting data field 118. When the engine is being started or when the ignition is turned on, the starting excess control must be brought into its initial position. This may be accomplished in one of two ways:
  (a) By actuating the starting motor which has the attendant disadvantage that, when the engine is being started by downhill motion of the vehicle or by pushing, no starting fuel is delivered; or
  (b) When the ignition is turned on and the engine speed is below a predetermined value, for example 50 rpm.

The latter method (b) has been found to be more favorable. It may be suitable to prevent exhaust gas recycling during engine starting. This is accomplished by the switch 96 which sets the air valve in the induction tube to a maximum air quantity as long as the engine starting circuit is operative.

Engine Warm-up Control

After engine starting and until a normal operating temperature is reached, it may be useful to admit a different fuel-air ratio than that normally determined by the characteristic data field of FIG. 6. This purpose is served by the engine warm-up control circuit 95 which applies a multiplying factor dependent on temperature and/or speed to the nominal air flow rate.

Drive Characteristics; Acceleration Limiter

Internal combustion engines which are capable of substantial torque output changes tend to buck when the gas pedal is depressed abruptly. It is thus desirable to delay the effect of the driver's action in order to prevent bucking or jerking. This purpose is accomplished by an accelerator limiter 92 which prevents only a limited, i.e., maximum, value of the function $\Delta Q_{KW}/\Delta$time. The value of this quotient may also be made rpm-dependent because at high engine speeds the value of $\Delta Q_{KW}/\Delta$ time can be greater than at lower engine speeds.

The drivability data field 91 produces a decreasing fuel quantity for increasing engine speed and prevents lost motion in the pedal. The decreasing fuel per stroke at increasing engine speed serves to make for a relatively comfortable control of the engine by means of the accelerator pedal because the decreasing fuel quantity may be equated with decreasing torque which increases the sensitivity of engine control and produces stable operating points with respect to engine speed. Self-igniting internal combustion engines with pure speed control may exhibit lost pedal motion, for example if the vehicle has been operated downhill and the accelerator pedal is then reapplied in normal driving. The aforementioned conditions are met by the data field illustrated in FIG. 11 which also includes the full-load maximum fuel limit.

Anti-Bucking Control

The vehicle and the engine installed therein together constitute a mechanism capable of natural oscillations which may be excited by external disturbances, for example by passage through a pot hole or the like. These oscillations which may be damped to varying degrees cause bucking of the vehicle, i.e., oscillatory engine speed changes or relative motions between the engine and the chassis. These engine speed changes or relative motions are used by the anti-bucking controller to cause an oppositely acting effect in the fuel injection pump, which drastically damps any tendency to buck. The appropriate controller 111 engages the nominal fuel quantity at the air side, i.e., at the point 93, additively, as well as the fuel side at the summing point 103. On the fuel side, the controller 111 exerts its influence only subsequent to the action of the minimum value selector 102 because a lack of air must not result in a suppression of the controller 111.

Delay Circuit and Consideration of Induction Tube Processes

The prevailing physical conditions in the engine are such that a changed, i.e., new, fuel quantity can be provided substantially quicker than a new air quantity. For this reason, the rapidity of fuel changes must be adapted to those of the air changes. This is done by a delay circuit 101 which applies the delay corresponding to the time of passage of air from the air flow rate meter to the inlet valves of the engine.

Idle Control

The idle controller 110 in FIG. 9 includes a PI-scanning controller with a stop and a D-scanning controller of the type DVZ1, i.e., a D-type controller with a first order delay element and a switch-off capability. This circuit is shown in detail in FIG. 10. The input signals of the idle controller in FIG. 10 are a temperature signal via an input 130, an engine speed signal via an input 131 and a signal related to a difference in engine speed applied at an input 132. The input 130 is part of a temperature-engine speed data field 133 whose output is connected to the comparison point 134 of the PI-controller 135. The input 132 goes to a summation point 136 as well as to a comparison point 137 to which is coupled the input of a D-controller 138. The output of the data field generator 133 is connected via a line 139 to the second input of the summation point 136. The negative inputs of both comparison points 134 and 137 are connected to the input 131. The output of the idle control circuit of FIG. 10 is applied to a summation point 141 where the two output signals of the controllers 135 and 138 are added.

The command value for the PI-controller 135 is determined by the temperature-engine speed data field of the signal generator 133 so that an idle engine speed $n_s$ can be given in temperature-dependent manner. The command value for the D-controller 138 is composed of the addition of the temperature-dependent idle engine speed and a constant value at the input 132. The output signals of both controllers are added and engage the fuel branch at the summation point 103 subsequent to the minimum value selector circuit 102. The constant value at the input 132 of the circuit in FIG. 10 is used by the D-controller so that, when the engine speed is rapidly diminished, the circuit becomes operative above the actual idling speed which tends to prevent an undue reduction of fuel and a drop of the engine speed in the sense of an excessive negative overshoot which might result in engine stoppage.

The PI-controller 135 may be embodied as a quasistatic PI-scan controller which has internal negative and positive limits. The negative output signals are suppressed externally. The command value for the controller 135 is the nominal idle speed. At higher engine speeds, the output signal of the idle controller returns to 0 as is appropriate for an idle speed controller whereas it goes to its positive limit at speeds lower than idling speed. The I-portion of the controller is especially significant with respect to load-dependent changes of the engine speed, for example when accessories are turned on and off. The I-portion of the controller controls these effects away without a permanent control error and returns the engine to nominal idling speed.

The D-controller 138 may be embodied as a D-scan controller with a first order delay which generates an output signal only for medium-to-large oscillations. During small oscillations of the engine speed, such as may occur in an engine due to non-uniform motion within a single rotation, the output is returned to 0, preferably according to an exponential function. When the engine speeds exceed $n_s + \Delta n$, the D-controller 138 is turned off and is no longer effective.

Figure 12:
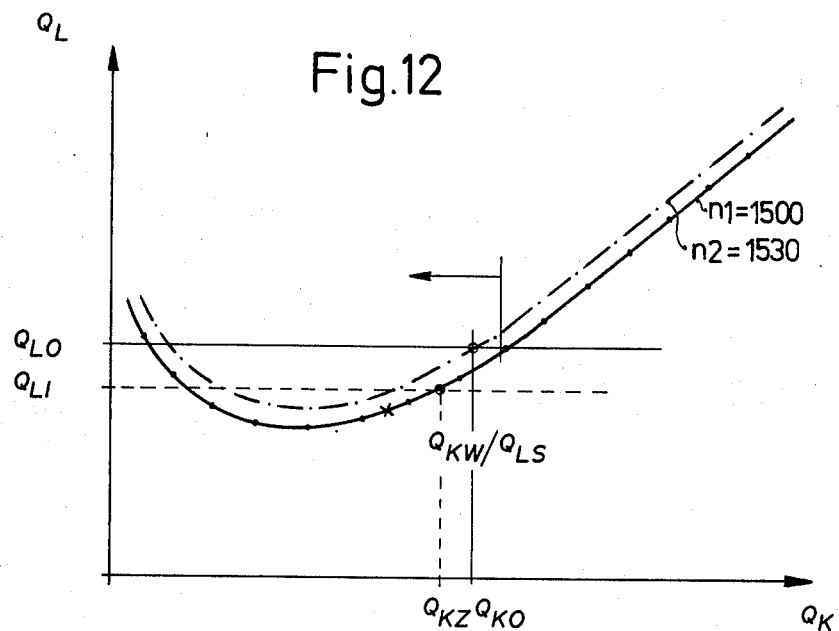
FIG. 12 is a diagram to illustrate a second possibility for determining the correct value in a multi-valued fuel-air data curve.

The illustration of FIG. 12 is related to a method for determining a single value of a basically multi-valued characteristic curve in a manner somewhat different from that illustrated with respect to FIG. 7. The new method consists of a dynamic searching for a permissible fuel value by means of a computer program.

The computer program begins with the latest previous pair of values of the fuel and air quantity, i.e. $Q_{KO}$ and and $Q_{LO}$. The program then determines the points in the characteristic data field which would apply to the instantaneous engine speed. The first step taken is the classification on the basis of the known values $Q_{KO}$, $Q_{LO}$, $Q_{KW}$, $Q_{LS}$ and $Q_{LI}$. The next step is the generation of a unique $Q_{LS}$ signal by the λ data field from the prevailing engine speed and the desired fuel value $Q_{KW}$. The comparison of the desired fuel with the old fuel value, the comparison of the prevailing air value with the old air value and finally the comparison of the nominal air value with the old air value determine the exact starting point in the direction of search. The search strategy is such that when two possible values are available for the magnitude $Q_{KS}$, the point chosen is the one that lies closest to the old pair of values $Q_{KO}$ and $Q_{LO}$ and /or lies in the direction of the desired pair of values $Q_{KW}$ and $Q_{LW}$. If the searching process is futile in one direction, i.e., if that branch of the curve does not contain any value of the air quantity equal to the prevailing air quantity $Q_{LI}$, then the search takes place from the starting point in the other direction. It is also possible that the present value of the air flow $Q_{LI}$ is smaller than the minimum of the curve in which case the change of algebraic sign in the curve is used to select the minimum value and its corresponding fuel magnitude. FIG. 12 illustrates an example for the case in which the desired fuel value $Q_{KW}$ is less than $Q_{KO}$; $Q_{LI} < Q_{LO}$ and $Q_{LS} < Q_{LO}$.

Figure 13:
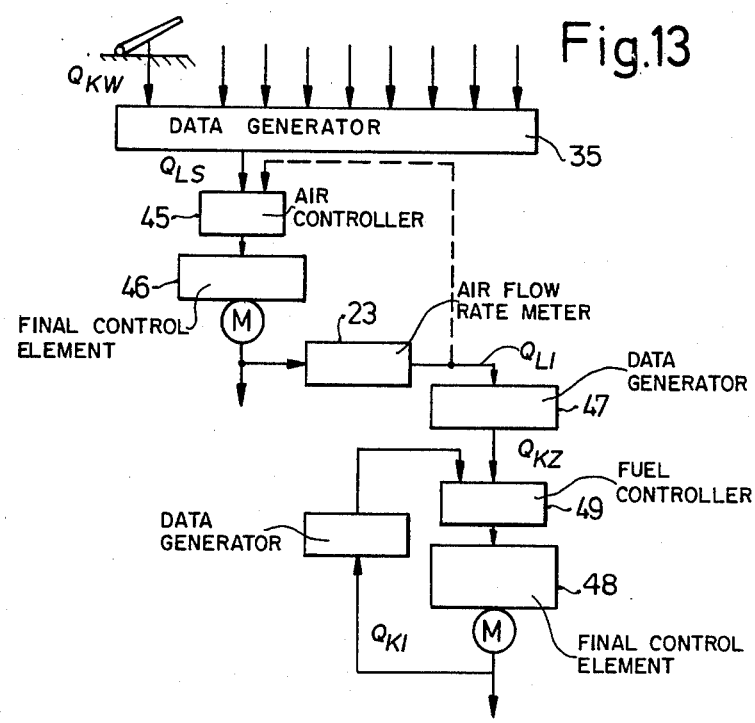
FIG. 13 is a circuit diagram of a simplified and less versatile device than that illustrated in FIG. 2.

FIG. 13 illustrates a circuit which is similar to that of FIG. 2 but somewhat simplified with respect thereto and serves for the control of fuel injection. The difference with respect to the circuit of FIG. 2 is that no pre-control of the fuel magnitude takes place, i.e., the connection from the output 42 of the characteristic data generator 35 to the input 50 of the fuel controller 49 which was present in FIG. 2 has been eliminated. The absence of this fuel pre-control makes the circuit simpler to produce but the overall acceleration of the vehicle in which an engine so equipped is placed is reduced. The simplified circuit of FIG. 13 may be used if the demands made on driver comfort and maximum accleration make such a choice advisable.

The foregoing relates to preferred exemplary embodiments of the invention, it being understood that other embodiments and variants thereof are possible without departing from the spirit and scope of the invention.

What is claimed and desired to be secured by Letters Patent of the United States is:

1. A method for controlling the fuel supply to an internal combustion engine equipped with an accelerator pedal, comprising the steps of:
   providing a first stored characteristic data field which relates nominal fuel quantity to accelerator pedal position;
   monitoring the position of the accelerator pedal, generating a signal indicative thereof and deriving from the generated accelerator pedal position signal and the first stored characteristic data field a nominal fuel quantity signal;
   providing a second stored characteristic data field which relates maximum permissible fuel quantity to actual air flow rate;
   measuring the air flow rate to the engine, generating a signal indicative thereof and deriving from the generated air flow rate signal and the second stored characteristic data field a maximum permissible fuel quantity signal; and
   generating a final fuel quantity control signal from the nominal fuel quantity signal and the maximum permissible fuel quantity signal for regulating a fuel flow control device.

2. The method as defined in claim 1, wherein:
   (i) the first stored characteristic data field relates nominal fuel quantity and nominal air quantity to accelerator pedal position;
   (ii) a nominal air quantity signal as well as a nominal fuel quantity signal are generated from the signal indicative of the monitored position of the accelerator pedal and the first stored characteristic data field; and
   (iii) the method further comprises the step of: generating a final air quantity control signal from the nominal air quantity signal and the signal indicative of the measured air flow rate for regulating an air flow control device.

3. A method according to claim 2, wherein the air flow control device simultaneously controls the exhaust gas recycle rate to the induction tube of the internal combustion engine.

4. A method according to claim 1 or 2, including the further step of increasing the fuel quantity fed to the engine during acceleration.

5. A method according to claim 1 or 2, including the further step of defining a secondary single-valued limiting curve which associates the air quantity per engine cycle to the fuel quantity per engine cycle so as to permit determination of a unique fuel magnitude from a given air magnitude, said secondary and limiting curve preferably being identical to the actual characteristic curve of the engine wherever that actual characteristic curve is single-valued.

6. A method for controlling the fuel supply to an internal combustion engine equipped with an accelerator pedal, comprising the steps of:
   providing a first stored characteristic data field which relates nominal fuel quantity to accelerator pedal position;
   monitoring the position of the accelerator pedal, generating a signal indicative thereof and deriving from the generated accelerator pedal position signal and the first stored characteristic data field a nominal fuel quantity signal;
   providing a second stored characteristic data field which relates nominal fuel quantity to nominal air quantity;
   generating a nominal air quantity signal from the second stored characteristic data field and the nominal fuel quantity signal;
   providing a third stored characteristic data field which relates maximum permissible fuel quantity to actual air flow rate;
   measuring the air flow rate to the engine, generating a signal indicative thereof and deriving from the generated air flow rate signal and the third stored characteristic data field a maximum permissible fuel quantity signal; and
   comparing the nominal fuel quantity signal with the maximum permissible fuel quantity signal and selecting the lower of the signals compared.

7. The method as defined in claim 6, further comprising the step of:
   generating a final air quantity control signal from the nominal air quantity signal and the signal indicative of the measured air flow rate for regulating an air flow control device.

8. The method as defined in claim 7, wherein the air flow control device simultaneously controls the exhaust gas recycle rate to the induction tube of the internal combustion engine.

9. The method as defined in claim 6, further comprising the steps of:
   generating an actual fuel flow rate signal; and
   generating a final fuel quantity control signal from the actual fuel flow rate signal and the selected lower signal of the nominal fuel quantity signal and the maximum permissible fuel quantity signal for regulating a fuel flow control device.

10. The method as defined in claim 6, further comprising the steps of:
    generating an actual fuel flow rate signal;
    generating a final air quantity control signal from the nominal air quantity signal and the signal indicative of the measured air flow rate for regulating an air flow control device; and
    generating a final fuel quantity control signal from the actual fuel flow rate signal and the selected lower signal of the nominal fuel quantity signal and the maximum permissible fuel quantity signal for regulating a fuel flow control device.

11. The method as defined in claim 10, wherein the air flow control device simultaneously controls the exhaust gas recycle rate to the induction tube of the internal combustion engine.

12. An apparatus for controlling the fuel supply to an internal combustion engine equipped with an accelerator pedal, comprising:
    a position transducer for generating an accelerator signal related to the position of the accelerator pedal;
    a first stored characteristic data field generator connected to the position transducer, and including a stored characteristic data field which relates nominal fuel quantity to accelerator pedal position, said first stored characteristic data field generator providing a nominal fuel quantity signal from the first stored characteristic data field and the accelerator signal;
    an air flow rate meter for generating a signal indicative of the actual air flow rate to the engine;
    a second stored characteristic data field generator connected to the air flow rate meter, and including a stored characteristic data field which relates maximum permissible fuel quantity to actual air flow rate, said second stored characteristic data field generator providing a maximum permissible fuel quantity signal from the second stored characteristic data field and the actual air flow rate signal;
    a fuel flow control device; and
    a fuel controller, connected to both stored characteristic data field generators and to the fuel flow control device for generating a final fuel quantity control signal from the nominal fuel quantity signal and the maximum permissible fuel quantity signal for regulating the fuel flow control device.

13. The apparatus as defined in claim 12, wherein:
    The stored characteristic data field stored in the first stored characteristic data field generator also relates nominal air quantity to accelerator pedal position;
    said first stored characteristic data field generator also provides a nominal air quantity signal from the first stored characteristic data field and the accelerator signal; and
    the apparatus further comprises: an air flow control device; and an air controller connected to the air flow control device and the first and second stored characteristic data field generators for generating a final air quantity control signal for regulating the air flow control device.

14. An apparatus for controlling the fuel supply to an internal combustion engine equipped with an accelerator pedal, comprising:
    a position transducer for generating an accelerator signal related to the position of the accelerator pedal;
    a first stored characteristic data field generator connected to the position transducer, and including a stored characteristic data field which relates nominal fuel quantity to accelerator pedal position, said first stored characteristic data field generator providing a nominal fuel quantity signal from the first stored characteristic data field and the accelerator signal;

a second stored characteristic data field generator connected to the first stored characteristic data field generator, and including a stored characteristic data field which relates nominal fuel quantity to nominal air quantity, said second stored characteristic data field generator providing a nominal air quantity signal from the second stored characteristic data field and the nominal fuel quantity signal;

an air flow rate meter for generating a signal indicative of the actual air flow rate to the engine;

a third stored characteristic data field generator connected to the air flow rate meter, and including a stored characteristic data field which relates maximum permissible fuel quantity to actual air flow rate, said third stored characteristic data field generator providing a maximum permissible fuel quantity signal from the third stored characteristic data field and the actual air flow rate; and comparator means connected to the first and third stored characteristics data field generator for comparing the nominal fuel quantity signal with the maximum permissible fuel quantity signal and selecting the lower of the signals compared.

15. The apparatus as defined in claim 14, further comprising:
a fourth stored characteristic data field generator including a stored characteristic data field which relates nominal air quantity to one of engine temperature and speed; and
a warm-up control circuit connected to the second and fourth stored characteristic data field generators for correcting the nominal air quantity signal during engine warm-up.

16. The apparatus as defined in claim 15, wherein the stored characteristic data field stored in the fourth stored characteristic data field generator relates nominal air quantity to both engine temperature and speed.

17. The apparatus as defined in claim 14, further comprising:
a further stored characteristic data field generator including a stored characteristic data field which which relates engine starting fuel quantity to one of engine temperature and speed, and generates therefrom an engine starting signal; and
a maximum selector circuit connected to the comparator means and the further stored characteristic data field generator for selecting the higher of the signals selected by the comparator means and the engine starting signal.

18. The apparatus as defined in claim 17, wherein the stored characteristic data field stored in the further stored characteristic data field generator relates engine starting fuel quantity to engine temperature and speed.

19. The apparatus as defined in claim 14, further comprising:
a fourth stored characteristic data field generator including a stored characteristic data field which relates nominal air quantity to one of engine temperature and speed;
a warm-up control circuit connected to the second and fourth stored characteristic data field generators for correcting the nominal air quantity signal during engine warm-up.
a fifth stored characteristic data field generator including a stored characteristic data field which relates engine starting fuel quantity to one of engine temperature and speed, and generates therefrom an engine starting signal; and
a maximum selector circuit connected to the comparator means and the fifth stored characteristic data field generator for selecting the higher of the signals selected by the comparator means and the engine starting signal.

20. The apparatus as defined in claim 19, wherein the stored characteristic data fields stored in the fourth and fifth stored characteristic data field generators relates nominal air quantity and engine starting fuel quantity, respectively, to engine temperature and speed.

21. The apparatus as defined in claim 19, further comprising:
a selector switch connected to the warm-up control circuit and the fifth stored characteristic data field generator, said selector switch having a maximum starting fuel quantity signal applied thereto, and said fifth stored characteristic data field generator also serving to switch said selector switch to receive the maximum starting fuel quantity signal.

22. The apparatus as defined in claim 14, further comprising:
an idle controller connected to the second stored characteristic data field generator and to the output of the comparator means, said idle controller serving to prevent an undue reduction in fuel during rapid reduction in engine rpm.

23. The apparatus as defined in claim 22, wherein the idle controller includes: a temperature-engine speed characteristic data field generator, a PI-controller connected to the temperature-engine speed characteristic data field generator; a D-controller connected to the temperature-engine speed characteristic data field generator; and means for adding the outputs of both the PI-controller and the D-controller to form the output of the idle controller.

24. The apparatus as defined in claim 12, further comprising:
a PI-controller for receiving input values related to the actual fuel and air flow rates, said PI-controller being connected to the second stored characteristic data field generator; and
a drift controller connected to the PI-controller and to the first stored characteristic data field generator.

* * * * *